UNITED STATES PATENT OFFICE.

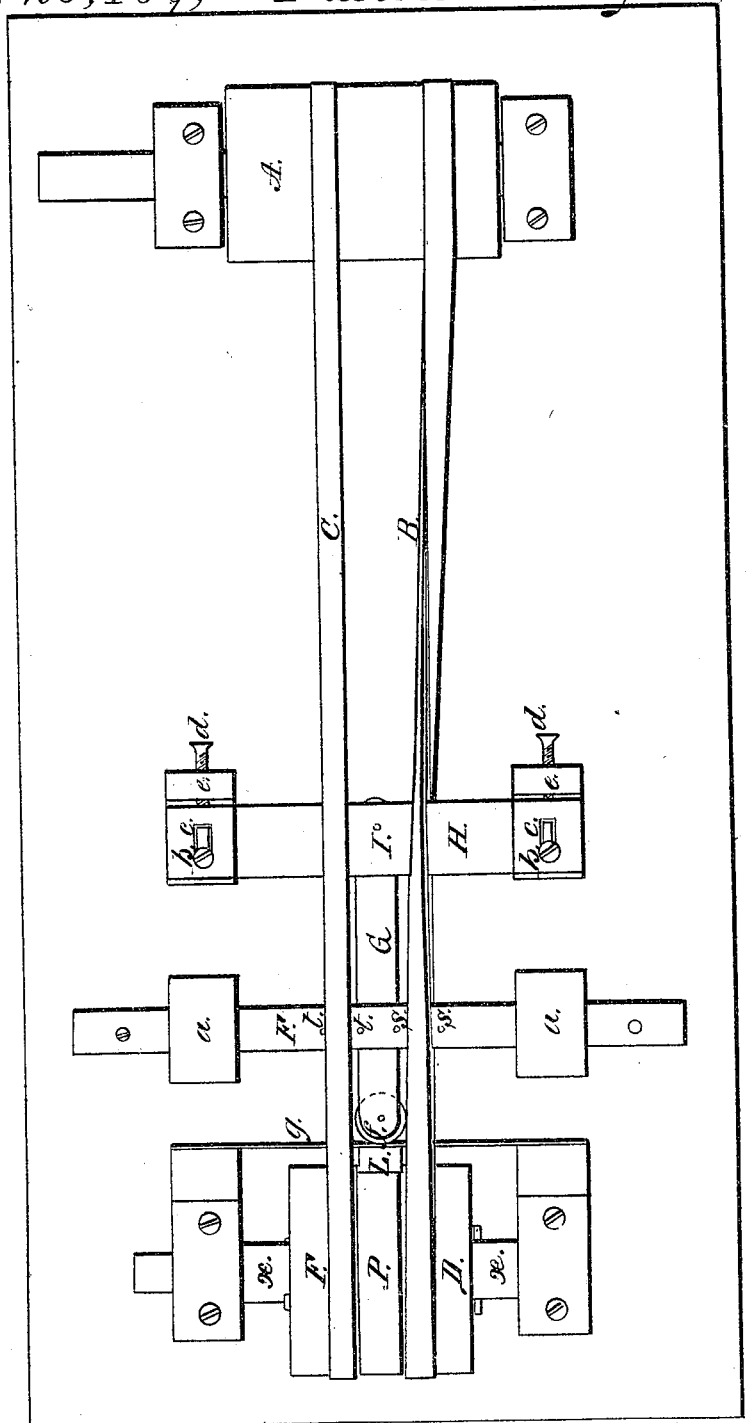

ALBERT BETTELEY, OF BOSTON, MASSACHUSETTS.

SHIPPER-GEAR FOR PULLEYS.

Specification of Letters Patent No. 25,169, dated August 23, 1859.

*To all whom it may concern:*

Be it known that I, ALBERT BETTELEY, of Boston, in the county of Suffolk and State of Massachusetts, have invented a new and useful Improvement in Shipper-Gear for Hoisting Apparatus, Which May be Also Applied to Operate the Mechanism of Lathes and other Machinery; and I do hereby declare that the following, taken in connection with the accompanying drawings, which form a part of this specification, is a description thereof so full and exact as to enable those skilled in the art to practice my invention.

The object I have had in view has been to provide an easier method of bringing the brake to bear at proper times upon the fast pulley, than the ordinary method in use, which requires for this purpose a very heavy strain upon the shipper rope, to move the brake lever and its brake, such strain being liable to cause rupture or breakage of the shipper rope.

The invention consists in making the brake independent from the brake lever or bar operating it, and hanging it upon a spring or its equivalent, which shall tend to keep it away from the surface of the pulley, excepting when borne and pressed against the same by a friction roller, applied to the end of the brake lever.

The accompanying drawing represents a top view of a shipping apparatus, such as is generally employed in hoisting, hotel and merchandise elevators, my invention being shown as applied thereto.

In the same A, denotes the driving pulley; B, C, two belts passing around the said pulley, and around two loose pulleys D, E, running on a shaft $x$, one of the belts being open and the other crossed, and each intended to run at proper times, over a fast pulley P, on the shaft $x$, to cause said pulley to rotate either in one direction or the other, and thereby communicate upward or downward movement to an elevator, or other weight, connected by any suitable gearing (applied to the windlass bearing the elevator chain or rope) to the shaft $x$.

The shipper bar is shown at F, as sliding in bearings at $a$, $a$, as having pins $s$, $s$, $t$ $t$, between which the belts B, C, run, and as actuating the brake bar G which is jointed to and so as to be moved by it. The operation of this shipper bar and pins in shipping each belt from the loose to the fast pulley, and vice versa, and in giving motion to the brake lever, are well understood, and are fully illustrated in the patent granted to me, bearing date May 31, 1859.

The brake lever or bar G, is hinged or jointed at its rear end, to an adjustable bar H, as seen at I. Set screws $b$, $b$, adjusting slots $c$, $c$, and actuating screws $d$, $d$, (passing through posts $e$, $e$,) are applied to this bar H, to allow of the path of a friction roller $f$, (applied and rotating in the other end of the lever) to be adjusted at pleasure, in order to compensate for wear of the friction roller and brake. The friction roller rides over, and operates at proper times, against a spring $g$, to which the brake L, is attached. When either of the belts is forced by the shipper bar, off the fast or to the loose pulley, the bar also swings the brake lever, and its roller, toward said pulley. As the friction roller comes into contact with the spring $g$, it forces the brake toward the pulley, and, continuing to do so as it is brought nearer into direct line with or opposite to the pulley, by a gradually increasing pressure, forces the brake against the surface of the pulley in such manner as to stop the rotation of the pulley, without any violent or sudden strain upon the shipper rope. No such liability of breaking the shipper rope takes place, as does when the brake itself instead of being forced gradually and perpendicularly up against the pulley, is thrown directly against the same, through the arc of a circle. When in my arrangement the pulley is released from the brake, to allow the elevator to continue its movement, the release is very easy and gradual, the roller sliding over the spring, and allowing the spring to bear away the brake from the pulley.

What I claim, is—

The combination of a brake lever, a friction roller, and an independent brake, applied, and operating together and with a shipping apparatus, substantially in the manner and for the purpose as above set forth.

ALBERT BETTELEY.

Witnesses:
J. B. CROSBY,
W. B. GLEASON.